United States Patent
Bindana et al.

(10) Patent No.: US 11,687,304 B1
(45) Date of Patent: Jun. 27, 2023

(54) METHODS AND SYSTEMS FOR ADDING CONTENT FROM AN EXTERNAL MEDIUM TO A JOB SUBMITTED AT A MULTIFUNCTION DEVICE

(71) Applicant: XEROX CORPORATION, Norwalk, CT (US)

(72) Inventors: Srinivasarao Bindana, Kakinada (IN); Ashok Jason Vedaraj, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/714,470

(22) Filed: Apr. 6, 2022

(51) Int. Cl.
*G06F 3/12* (2006.01)
*H04N 1/00* (2006.01)

(52) U.S. Cl.
CPC .......... *G06F 3/1272* (2013.01); *G06F 3/1205* (2013.01); *G06F 3/1292* (2013.01); *H04N 1/00307* (2013.01); *H04N 1/00334* (2013.01); *H04N 2201/0094* (2013.01)

(58) Field of Classification Search
CPC .... G06F 3/1272; G06F 3/1205; G06F 3/1292; H04N 1/00307; H04N 1/00334; H04N 2201/0094

USPC .................................................. 358/1.15
See application file for complete search history.

(56) References Cited

U.S. PATENT DOCUMENTS

| | | | |
|---|---|---|---|
| 2017/0374230 A1* | 12/2017 | Song | H04N 1/00408 |
| 2022/0269446 A1* | 8/2022 | Sasaguri | G06F 3/1292 |
| 2022/0308804 A1* | 9/2022 | Teves | G06F 3/1205 |
| 2022/0311879 A1* | 9/2022 | Renes | H04N 1/00244 |

\* cited by examiner

*Primary Examiner* — Allen H Nguyen (57) ABSTRACT

The present disclosure discloses methods and systems for allowing a user to add content from an external medium to a job submitted at a multi-function device. The method includes receiving a job at the multi-function device for a pre-defined operation. The method further includes providing a user interface at the multi-function device including an option for adding the content from the external medium. Once the option is selected, a code generated corresponding to the job is displayed at the multi-function device. Upon scanning the code, the user selects the content to be added and provides details of the content to be added from the external medium. Finally, the selected content is added in the job resulting in a final output.

27 Claims, 6 Drawing Sheets

METHODS AND SYSTEMS FOR ADDING CONTENT FROM AN EXTERNAL MEDIUM TO A JOB SUBMITTED AT A MULTIFUNCTION DEVICE

TECHNICAL FIELD

The present disclosure relates to multi-function devices, more specifically, relates to methods and systems for adding content from an external medium to a job submitted at a multi-function device.

BACKGROUND

Multi-function devices have become quite common and essential in our day-to-day life. The multi-function devices process various jobs such as print job, scan job, copy job, scan to email job, or the like. A user can submit a job either using his computing device or can directly submit a job at the multi-function device. For example, the user can submit a print job simply by selecting a document on his computing device. In another example, the user can submit a scan job directly at the multi-function device.

Once the job is submitted at the multi-function device, there can be situations when the user requires to add some content to the submitted job. For example, the user may need to add the content such as an image, a table, another document, to the submitted job. In another example, the user may want to add supporting documents such as address proof to an application form and sometimes the user may want to add charts, graphs, or other images in a company report. Also, there can be scenarios where the content that the user wishes to add is present on his mobile device instead of his computing device. For adding such content, the user is required to first transfer the desired content from his mobile device to the computing device, then the user manually adds the image to the document and then submits the updated document for printing via his computing device. This process requires manual effort and time by the user. Sometimes it could be frustrating for the user.

In this light, there is a need for simple and user-friendly methods and systems that can allow users to transfer content from an external medium to one or more jobs already submitted at the multi-function device.

SUMMARY

According to aspects illustrated herein, a method for allowing a user to add content from an external medium to a job submitted at a multi-function device is disclosed. The method includes receiving a job at the multi-function device for a pre-defined operation. The method further includes providing a user interface at the multi-function device including an option for adding content from the external medium. Based on the selection of the option, a code generated corresponding to the job is displayed at the multi-function device. Once the code is scanned, the method allows the user to select the content to be added and details of the content to be added from the external medium. Thereafter, the user selected content is added in the job resulting in a final output.

According to further aspects illustrated herein, a system for allowing a user to add content from an external medium to a job submitted at a multi-function device is disclosed. The system includes a multi-function device for receiving a job at the multi-function device for a pre-defined operation. Further, the multi-function device provides a user interface including an option for adding content from the external medium. Based on the selection of the option, the multi-function device displays a code generated corresponding to the job at the multi-function device. Once the code is scanned, the multi-function device, allows the user to select the content to be added and details of the content to be added from the external medium. Thereafter, the multi-function device adds the user selected content in the job resulting in a final output. Additionally, the system includes the external medium for storing the content to be added in the submitted job.

According to additional aspects illustrated herein, a system for allowing a user to add content from a portable device to a job submitted at a multi-function device is disclosed. The system includes a multi-function device which further includes a receiver for receiving a job at the multi-function device for a pre-defined operation. The multi-function device further includes a user interface including an option for adding content from the portable device. Further, the multi-function device includes a controller that displays a code generated corresponding to the job at the multi-function device based on the selection of the option. Once the code is scanned, the controller allows the user to select the content to be added and details of the content to be added from the portable device. The multi-function device further includes a content addition module for adding the selected content in the job resulting in a final output. Additionally, the system includes the portable device for storing the content to be added in the submitted job.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, or the like. The multi-function device may include software, hardware, firmware, or a combination thereof. In the context of the current disclosure, the multi-function device allows a user to transfer content from an external medium or a device to a job at the multi-function device. The multi-function device allows the user to transfer the content either after the job is submitted at the multi-function device or while submitting the job at the multi-function device.

The term "pre-defined operation" refers to any imaging operation that can be performed at the multi-function device. Some examples of the pre-defined operation may include printing, scanning, copying, or the like. The pre-defined operation is performed on the job at the multi-function device and is based on a user requirement and/or command from the user.

The term "job" refers to a scan job, print job, or a copy job submitted at the multi-function device for processing. The job includes a document in a physical form or in a digital form. For example, if the job is a scan job or a copy job, then the document is in the physical form. But if the job is a print job, then the document is in the digital form. The document can have one or more pages including content in the form of text, image, graphics, or a combination thereof. The term "final output" refers to an output generated upon performing the pre-defined operation. For example, if the pre-defined operation is scanning, then the final output is scanned document. In another example, if the pre-defined operation is copy, then the final output is a copy of the document. In further example, if the pre-defined operation is print, then the final output is printed document.

The term "content" refers to any type of content that the user wishes to add to the job submitted at the multi-function device. The content can be an image, text, graphs, or a combination thereof. The content can include a document including texts, graphs, images, infographics, or the like. The content is stored in an external medium such as a portable device of the user.

The term "details" refers to information/details related to the content to be added in the job, specifically, in the document associated with the job. The details can include page details and location details, where the page details represent any direct or indirect details associated with the page and the location details refer to which location of a page to add the content in the job. These are two examples of the details, but other examples of the details can be implemented. The page details include page numbers of the document where the content is to be added. The page details may further include whether the content is to be added as a new page in the document, or existing pages of the document. The page details may be about whether to add the content as an image or text on a new page in the document or on one or more existing pages of the document. Additionally, the page details may include whether to add the content as a watermark on the existing pages of the document. The location details represent where the content is to be added on specific page(s) of the document. In simple words, the location details include details related to location on specific pages where the content is to be added. Exemplary location details include a top right corner of a page, a top left corner of a page, a bottom right corner of a page, a bottom left corner of a page, a center of a page, and so on. Other details can be such as whether to add the content at the beginning of the document, end of the document, in between pages of the document, or the like. These are few non-limiting examples of the details for easy understanding, but other details related to the content can be considered for implementing the present disclosure.

The term "external medium" refers to any external source (other than the multi-function device) where the content that the user wishes to add in the job at the multi-function device, is stored. For example, the external medium can be a portable device. But the external medium can be a cloud location, network location, a server or the like.

The term "portable device" refers to a device that the user uses for various purposes such as calling, emails, work, or the like. In context of the current disclosure, the portable device includes the content that the user wishes to add to the job submitted at the multi-function device. Various examples of the portable device include but are not limited to, a mobile phone, a tablet, a Personal Digital Assistant (PDA), a smartphone, or any other portable device capable of storing the content. The portable device includes a camera/scanner which can scan and read codes, such as QR codes. The QR code pairs the multi-function device with the portable device. Additionally, the portable device includes a display for displaying the content to be added, a temporary web page or other relevant details.

The term "code" can be any 2-dimensional code such as QR code, presented on the multi-function device corresponding to the job at the multi-function device. The code is generated specific to the job of the user.

The term "adding" refers to addition of content from the portable device to the job at the multi-function device.

Overview

The present disclosure discloses methods and systems that allow a user to add content from an external medium to a job at a multi-function device. Specifically, the methods and systems allow the user to transfer content from the external medium to the job at the multi-function device. The external medium can be any portable device of the user such as a mobile device that can be paired with the multi-function device for content addition. The job can be a scan job or a print job. The user selects content from the portable device and sends the selected content to the multi-function device, upon successful pairing. The multi-function device then adds the user selected content to the job resulting into an output document. The output document includes the content added from the portable device. This way, the methods and systems provide a user-friendly and an easy way to add the content from the external medium to the jobs at the multi-function device.

The methods and systems integrate the portable device of the user with the multi-function device such that any content stored in the portable device of the user can be transferred to jobs being processed at the multi-function device. The methods and systems integrate the content received from the portable device of the user in the output document.

For example, if a user wishes to add content such as a watermark to all the pages of a report to be printed, then the user first sends the report to the multi-function device for printing. Here, the watermark is stored on a mobile device of the user, for example. After submitting the report at the multi-function device, the user pairs his mobile device with the multi-function device. The user selects the watermark from his mobile device and the selected watermark is transferred to the multi-function device. The multi-function device adds the watermark to all pages of the report and outputs a final report. The final report includes the user selected content, watermark, in this case, on all pages of the report.

Exemplary Environment

Figure 1:
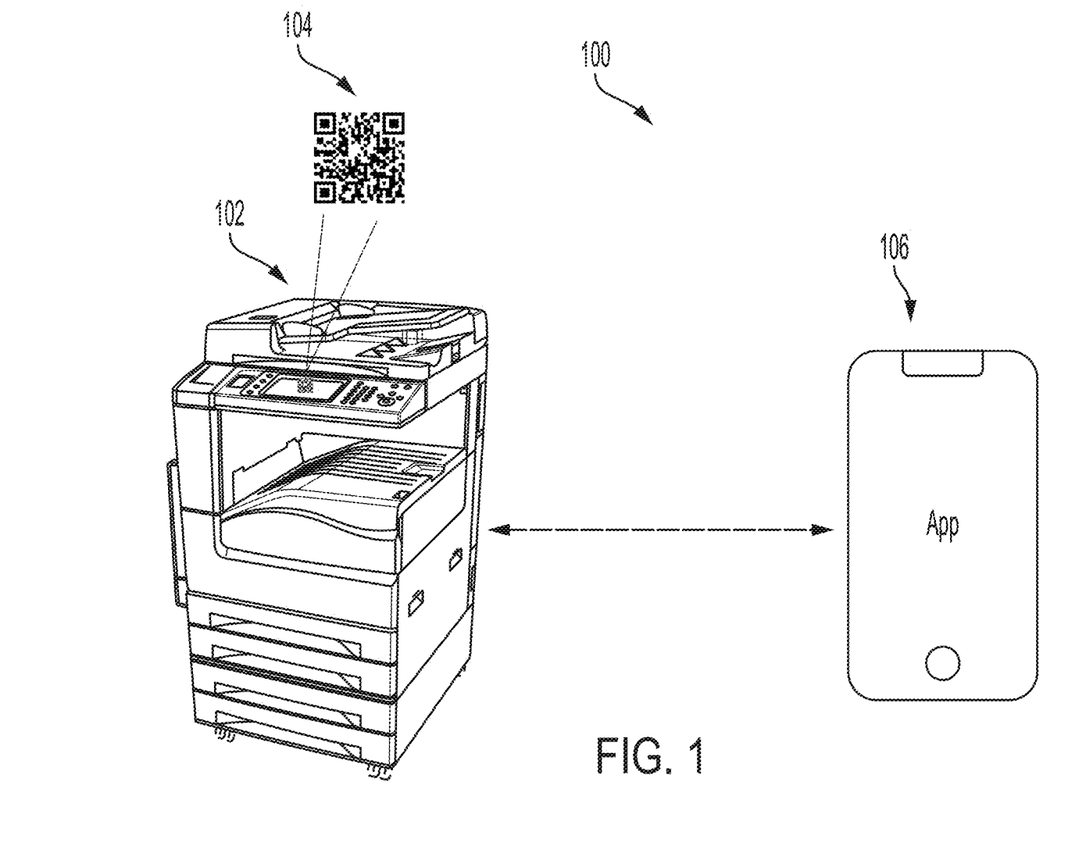
FIG. 1 shows an exemplary environment in which various embodiments of the present disclosure can be practiced.

FIG. 1 shows an exemplary environment 100 in which various embodiments of the disclosure can be practiced. The environment 100 is shown to include a multi-function device 102 and an external medium such as a portable device 106 of a user. The multi-function device 102 provides one or more functionalities such as printing, scanning, imaging, copying, and so on. Various examples of the multi-function device 102 may be a printer, a scanner, a copier, a multi-function printer, a multi-function peripheral device, or the like. In context of the present disclosure, the multi-function device 102 allows a user to add content from the portable device 106 to a job submitted/received at the multi-function device 102.

The portable device 106 may be any device of the user that the user uses for his day-to-day work such as emails, chat, surfing, work, or the like. Further, the portable device 106 is communicatively coupled to the multi-function device 102 via the Internet, Bluetooth, for example. Internet and Bluetooth technology are just two examples, the portable device 106 of the user can be paired with the multi-function device 102 using known or later developed technologies. Further, the portable device 106 includes an app that allows the portable device 106 to read a code such as QR code 104 and pair with the multi-function device 102. The portable device 106 stores different contents such as images, documents, watermarks, graphs, or the like, to be added to the job at the multi-function device 102. Various examples of the portable device 106 may include a mobile device, a personal digital assistant (PDA), or any portable device having capability to pair with the multi-function device 102 and further having capability to scan any codes such as QR code 104 shown on the multi-function device 102.

In operation, a user submits a job at the multi-function device 102. The job can be a scan job, print job, a copy job, or the like. The job includes a document for printing, scanning, or copying. The document includes content in the form of text, image, graphics, or the like. If a job is a scan job, then the document submitted at the multi-function device 102 is in physical form, and the final output generated is in a digital form. If a job is a print job, the document submitted at the multi-function device 102 is in digital form, and the output generated is in the physical form. Post job submission, the user selects an option for adding content to the job using his portable device 106. The user then pairs his portable device 106 with the multi-function device 102 using known ways or methods. Once paired, the user selects an image, for example, stored on his portable device 106 for addition. The selected image is then transferred from the portable device 106 of the user to the multi-function device 102. The image is received at the multi-function device 102 for addition. The multi-function device 102 finally adds the received image to the job at the multi-function device 102. The multi-function device 102 adds the user selected image at a desired location and/or in the desired form in the job. This way, the multi-function device 102 successfully adds the content from the external medium to jobs at the multi-function device 102.

Exemplary System

Figure 2:
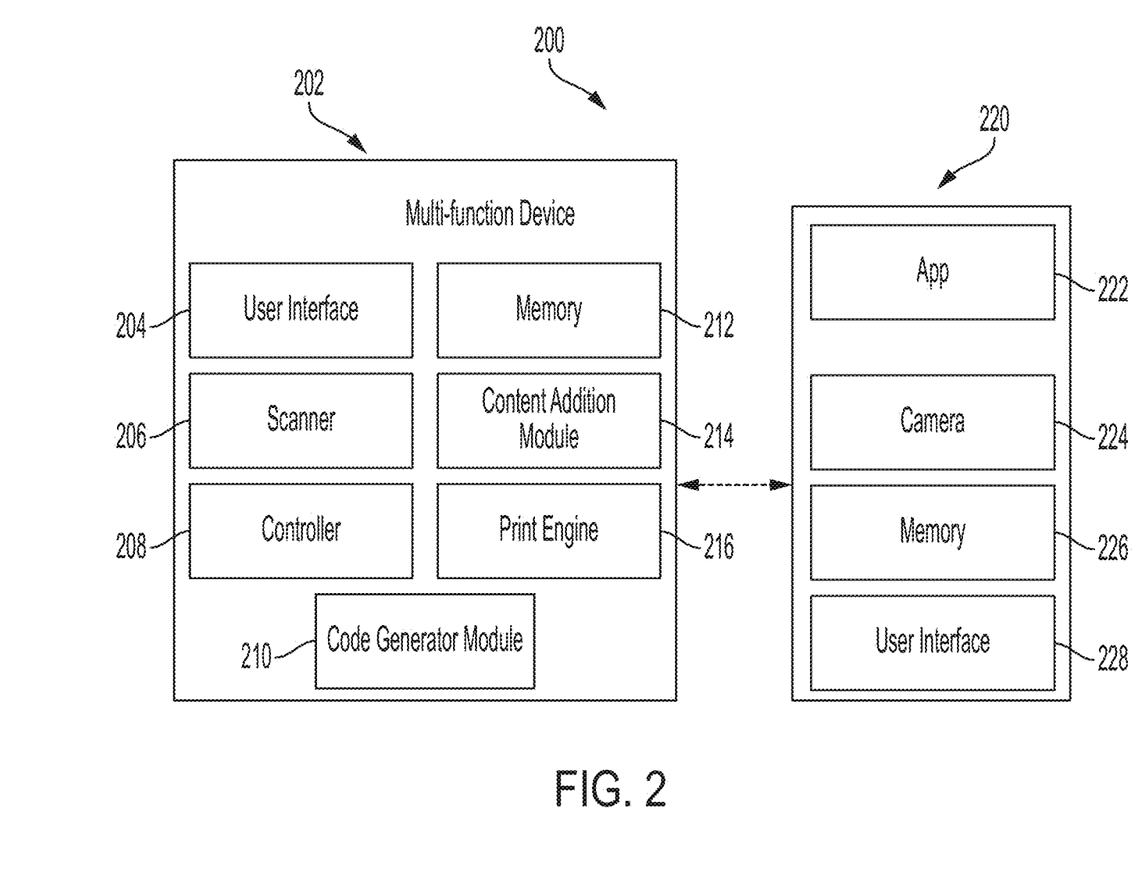
FIG. 2 is a block diagram illustrating various components of a multi-function device and a portable device, in accordance with an embodiment of the present disclosure.

FIG. 2 is a block diagram illustrating various components of a system 200 including a multi-function device 202 and a portable device 220. As shown, the multi-function device 202 includes a user interface 204, a scanner 206, a controller 208, a code generator module 210, a memory 212, a content addition module 214 and a print engine 216. The components 204-216 are connected to each other via a conventional bus or a later developed protocol. And the components 204-216 communicate with each other for performing various functions of the present disclosure. The multi-function device 202 may further include additional component(s) as required to implement the present disclosure.

The portable device 220 is communicatively coupled to the multi-function device 202 via a communication network as known or later developed ways. In one example, the portable device 220 may be connected to the multi-function device 202 via a wireless network such as Bluetooth, Wifi, etc. But in other example, the portable device 220 may be connected to the multi-function device 202 via a wired network such as ethernet cable, optical fiber cable, etc. The portable device 220 is connected to the multi-function device 202 such that any content from the portable device 220 can be transferred to the multi-function device 202 and can be finally added to an existing job at the multi-function device 202.

As shown, the portable device 220 includes an app 222, a camera 224, a memory 226 and a user interface 228. And the components 222-228 communicate with each other for performing various functions of the present disclosure. The portable device 220 may further include additional component(s) as required to implement the present disclosure. Additionally, each of the components 204-216 and 222-228 communicates with each other for adding content to a job at the multi-function device 202.

The implementation begins when a user wishes to add content to a job submitted at the multi-function device 202 for further processing. The job can be a print job, scan job, a copy job, or the like. To this end, the user submits a job. For example, the user can submit a print job using his computing device or other devices (not shown). Here, the print job can be a digital document that can be submitted through any computing device such as a laptop, a computer, a mobile device, or a portable computing device. In another example, the user can submit a scan job at the multi-function device 202. Here, the scan job can be a physical document that can be directly submitted at the multi-function device 202 such as a platen. Similarly, the copy job can be directly submitted at the multi-function device 202. While submitting the job at the multi-function device 202, the user submits job attributes. For example, if the job is a print job, the user submits print attributes such as single-sided, double-sided, black&white, color, number of copies, orientation, etc. The print attributes are submitted via the computing device. If the job is a scan job, the user submits scan attributes such as destination, scan resolution, file type to be created, color scan, black&white scan, number of copies, or the like. The scan attributes can be submitted directly at the multi-function device 202 such as via a user interface 204 of the multi-function device 202. This way, the user successfully submits the job at the multi-function device 202. For easy understanding, the disclosure is discussed with respect to the scan job as an example, but it is understood that the disclosure is applicable to all other types of jobs submitted at the multi-function device 202 for processing.

Figure 3A:
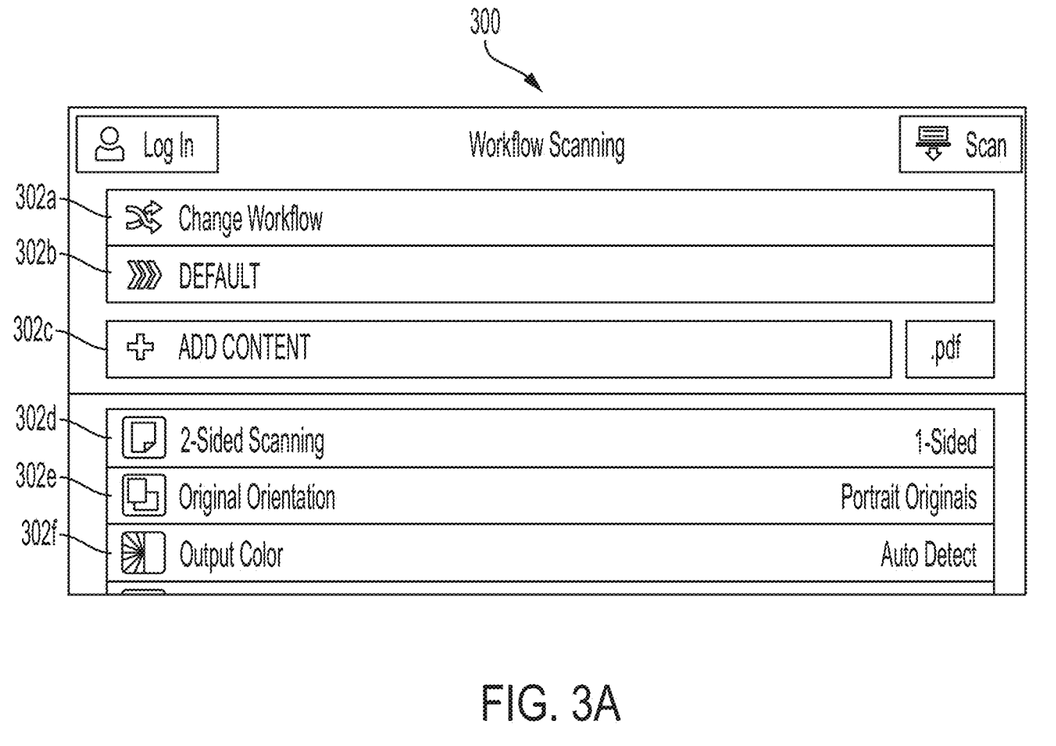
FIGS. 3A-3B are exemplary snapshots of user interfaces, in accordance with an embodiment of the present disclosure.

Post submitting the scan job and selection of the scan attributes at the multi-function device 202, a user interface 204 further displays a new option such as "Add Content" option to the user. The new option allows the user to add content such as text, image, or a document from the portable device 220 to the submitted scan job. One exemplary user interface 300 including different options to configure scan parameters is shown in FIG. 3A. As illustrated, the user interface 300 displays various options such as change workflow 302a, default 302b, 2-sided scanning 302d, original orientation 302e, and output color 302f. In context of the current disclosure, the user interface 300 includes a new option "Add Content" (marked as 302c). The option 302c allows the user to add contents to the jobs/documents submitted for scanning. Here, the user selects the "Add Content" option 302c.

Once selected, the controller 208 triggers the code generator module 210 to generate a code corresponding to the job submitted at the multi-function device 202. The job here refers to the one in which the user wishes to add the content in the form of text, image, graphics, document, or a combination thereof. The code generator module 210 generates a code such as a QR code, corresponding to the job at the multi-function device 202. To this end, the code generator module 210 first assigns a temporary storage space corresponding to the job. The storage space may be a part of the memory 212 of the multi-function device 202 or may be a cloud location or a network location accessible through the multi-function device 202. Once assigned, the code generator module 210 generates a link for the assigned storage space. For example, if the code generator module 210 assigns a storage space in the memory 212 to a scan job with job identity "Job32", and IP address of the multi-function device 202 is 13.61.29.86, then, the code generator module 210 generates a link https://13.61.29.86/ScanJob32/AddContent. Once the link is generated, the code generator module 210 generates a code corresponding to the link. The code generated is unique for the job submitted at the multi-function device 202. Thereafter, the code generator module 210 communicates and sends the generated code to the controller 208. The controller 208 further displays the generated code to the user via the user interface 204 of the multi-function device 202.

As a next step, the user scans the displayed code using his portable device 220 such as a mobile device. In detail, the user accesses an app 222 to scan the displayed code. The app 222 triggers the camera 224 of the portable device 220 to scan the displayed code. The app can be any code reader app for reading/scanning the displayed code. Alternatively, the user can directly scan the displayed code using the camera 224. Once the code displayed on the multi-function device 202 is scanned, a request to pair the portable device 220 with the multi-function device 202 is sent. Specifically, the portable device 220 sends the pair request to the controller 208 of the multi-function device 202. Once received, the multi-function device 202 establishes a communication channel between the portable device 220 and the multi-function device 202. The connection can be established via Internet (wi-fi), or Bluetooth. These are just two examples but any known or later developed communication technology can be implemented to establish the communication between the portable device 220 and the multi-function device 202. Additionally, the portable device 220 may send identity details of the portable device 220 such as phone number, device MAC address, device IP address, or the like. In one example, the communication channel/connection is established after authenticating the portable device 220. For example, the user may be first prompted via the portable device 220 to provide his identity details such as user ID, name, employee ID, or the like. Once provided, the details are forwarded to the multi-function device 202 for authentication. Upon successful authentication, the portable device 220 is paired with the multi-function device 202. This way, the portable device 220 is paired with the multi-function device 202.

Once paired, the portable device 220, specifically the app 222 accesses the link associated with the code, i.e., link of the storage location embedded in the code. Alternatively, the user can directly access the camera 224 to scan the displayed code. Thereafter, the user interface 228 of the portable device 220 further displays two options such as web browser option and an app option. These options allow the user to access the link embedded in the QR code. Here, if the user selects the web browser option, then the web browser (not shown) is used to access the link and if the user selects the app, then the app 222 is opened first and thereafter the app 222 accesses the link. This way, the link of the storage location embedded in the code is accessed. This way, the displayed code is successfully accessed and scanned by the portable device 220. Thereafter, a temporary web page is generated and displayed to the user.

The user interface 228 of the portable device 220 displays the temporary web page generated corresponding to the job. The web page displays various options that allow the user to select one or more content such as images, text, graphs, or the like stored in the memory 226 of the portable device 220 and send the selected content to the multi-function device 202 for addition. The web page further displays options that allow the user to provide details related to the content to be added in the job. Here, the details can include page details and location details. For example, the page details include page numbers of the document where the content is to be added. The page details may further include whether the content is to be added as a new page in the document or on existing pages in the document. The page details further include whether to add the content as a text or as an image on a new page or existing pages of the document. Additionally, the page details may include whether to add the content as a watermark on the existing pages of the document/in the job. Further, the location details include details related to location on a specific page where the content is to be added, such as top right corner, top left corner, bottom right corner, bottom left corner, center, etc. For this, the web page displays options to add the content on a new page, i.e., the content is added as a new page in the document submitted at the multi-function device 202. Further, the web page displays options to add the content on existing pages of the document submitted at the multi-function device 202. Also, the web page displays options to add the content as a watermark on the pages of the document.

Figure 3B:
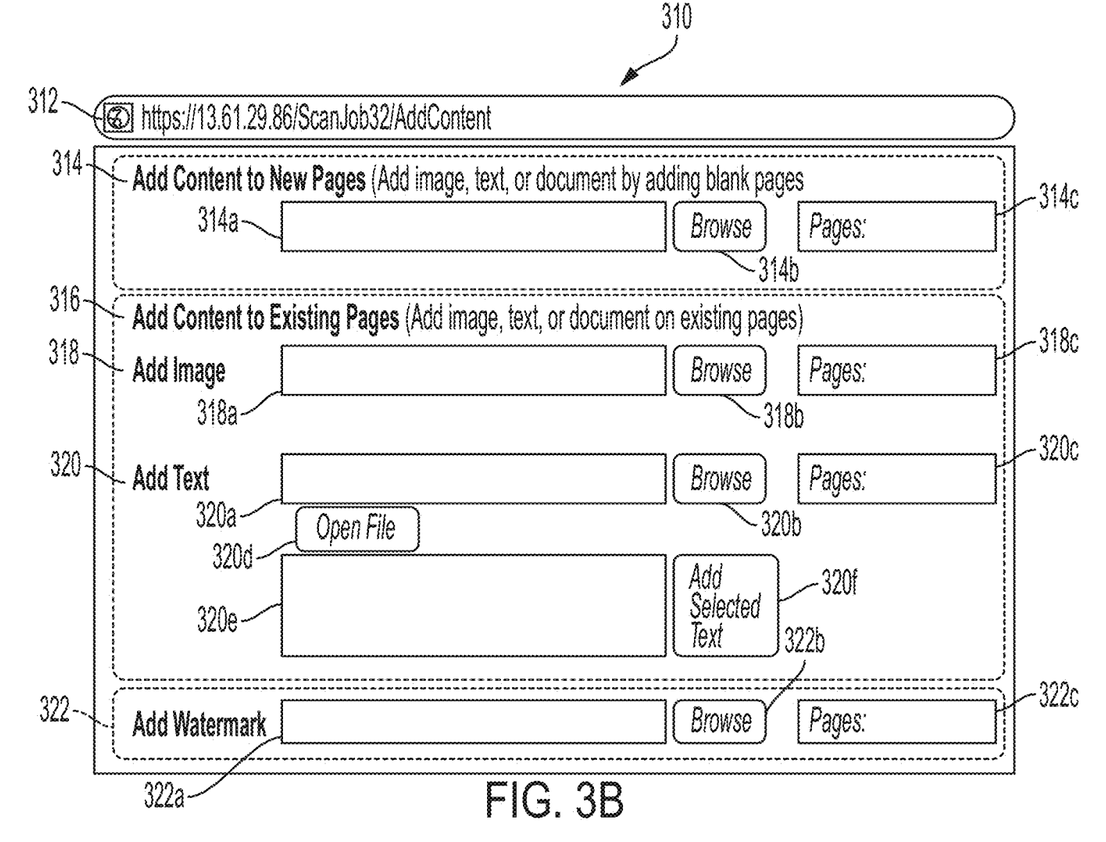

One such exemplary user interface 310 of a temporary web page is shown in FIG. 3B. The user interface 310 is presented to the user when the portable device 220 is paired with the multi-function device 202. The user interface 310 displays various options that allow the user to select and share desired content stored in the portable device 220 with the multi-function device 202. As illustrated, the user interface 310 includes various options such as 314, 316, 318, 320, 322, etc., and link of the web page 312 which is "https://13.61.29.86/ScanJob32/AddContent". The link 312 includes details, where "13.61.29.86" is the IP address of the multi-function device 220, "ScanJob32" is the job ID, "AddContent" indicates the option selected by the user. In the illustrated FIG. 3B, the user interface 310 includes "Add Content to New Pages" option 314, "Add Content to Existing Pages" option 316, and "Add Watermark" option 322.

The option "Add Content to New Pages" 314 allows the user to select and add the selected content to a new page, i.e., the content selected by the user is added as a separate page. For example, if the user wishes to add a cover page to a 10-page document, then the user selects the "Add Content to New Pages" option 314 to select the cover page stored in the portable device 220, resulting in an 11-page document. Further, the "Add Content to New Pages" option 314 includes a text box 314a, a browse option 314b and pages option 314c. The user can use the browse option 314b to browse and identify a location in the portable device 220 where a desired content is stored. Once the location is identified, the user can select the desired content. Once selected, the location of the content and the name of the content/file is displayed in the box 314a. The pages option 314c allows the user to specify the pages of the document where the user wishes to add the content. For example, if the user wishes to add a cover page, the user can enter '1', if the user wishes to add a content at the end of a 5-page document, then the user can enter the number '6', and so on.

The "Add Content to Existing Pages" option 316 allows the user to add the content on existing pages of the document. For example, in a 5-page document, if the user wishes to add an image on the 3rd page of the document, then the user can select the "Add Content to Existing Pages" option 316 to select the desired image and obtain a 5-page document in which 3rd page includes the user-selected image. Further, the "Add Content to Existing Pages" option 316 includes "Add Image" option 318 and "Add Text" option 320. The "Add Image" option 318 allows the user to select a desired image to be added to an existing page of the document and the "Add Image" option 318 includes a box 318a, a browse option 318b and pages option 318c. The browse option 318b allows the user to browse and identify the location of the desired image to be added and the path or link to the identified location is displayed in the box 318a. In simple words, the browse option 318b allows the user to browse content/image stored in the portable device 220 and select the desired image to be added in the job. The page option 318c allows the user to specify the pages of the document on which the selected image is to be added. The "Add Text" option 320 allows the user to select and add desired text from a file/document stored in the portable device 220 to an existing page of the document. The "Add Text" option 320 includes a box 320a, a browse option 320b, pages option 320c, an open file option 320d, another box 320e, and add selected text option 320f. The browse option 320b allows the user to browse and identify location of the desired file from which the text is required to be added. The path or link of the selected location is displayed in the box 320a. The open file option 320d allows the user to open the selected file and once selected, the file is accessed and displayed in the box 320e. Once displayed, the user can select desired text from the displayed file. The add selected text option 320f allows the user to add the text selected by the user and the page option 320c allows the user to specify the page of the document on which the selected text is required to be inserted. Additionally, the "Add Image" option 318 and the "Add Text" option 320 may include an additional option, such as add location that allows the user to specify the location on specific pages of the submitted document where the image or the text is required to be added. The add location option can be a drop-down option which includes a list of locations such as a top right corner of a page, top left corner of a page, bottom right corner of a page, bottom left corner of a page, center of a page, etc.

The "Add Watermark" option 322 allows the user to add the desired content as a watermark to existing page(s) of the document. For example, in a 5-page document, if the user wishes to add an image of a company logo as a watermark on all the pages of the document, then the user can select the "Add Watermark" option 322 to select the desired image resulting into a 5-page document having a watermark on all pages. Further, the "Add Watermark" option 322 includes a box 322a, a browse option 322b and pages option 322c. The browse option 322b allows the user to browse and identify location of the desired content to be added and the path or link to the identified location is displayed in the box 322a. The page option 322c allows the user to specify the page of the document on which the watermark is to be added. This way, the user can select the one or more desired content and provide input/details regarding addition of the selected content.

Thereafter, the controller 208 obtains the content to be added in the job at the multi-function device 202 and details related to the addition of the content. Thereafter, the user configures other properties related to the job and initiates the processing.

Once initiated, the controller 208 triggers the scanner 206 to scan the received document and generate scanned data. Once generated, the controller 208 sends the scanned data, the content to be added in the scan job and details related to the content to be added to the content addition module 214 for further processing.

Once received, the content addition module 214 processes the received document, the content to be added and details related to the content to be added. Thereafter, the content addition module 214 adds the content selected by the user to the scanned data based on the user input and generates a final output such as scanned document. The scanned document includes the user selected content at a desired location and/or in a desired form.

In one example, in a 5-page document submitted at the multi-function device 202, if the user input indicates that the user wishes to add a cover page before the $1^{st}$ page of the document, then the content addition module 214 adds a cover page to the 5-page document resulting into a 6-page document. In another example, in a 6-page document submitted at the multi-function device 202, if the user input indicates that the user wishes to add an image on a new page after the $2^{nd}$ page of the document, then the content addition module 214 adds the image as a new page resulting into 7-page document. The 7-page output document includes the $1^{st}$ and $2^{nd}$ pages corresponding to 1st and $2^{nd}$ pages of the submitted document, $3^{rd}$ page is a new page including the user-selected image, and the remaining pages from $4^{th}$ to $7^{th}$ pages of the output document corresponds to $3^{rd}$ to $6^{th}$ page of the submitted document. In yet another example, in a 5-page document submitted at the multi-function device 202, if the user input indicates that the user wishes to add an image as a watermark on the $3^{rd}$ and $4^{th}$ page of the submitted document, then the content addition module 214 simply adds the watermark on 3rd and $4^{th}$ pages of the submitted document.

This way, the content addition module 214 adds the new content from the external medium such as portable device 220 and generates an output document including the new content as the user-selected content. The content addition module 214 sends the output document to the controller 208 for further processing. The controller 208 then sends the output scanned document to the desired destination such as email, network location, server location, USB, or the like. But if the submitted job is a print job, then the controller 208 triggers the print engine 216 to print the output document. The output document is a printed document including the content added from the portable device 220. Similarly, the controller 208 generates a copy of the job if the job is a copy job. In this case, the multi-function device 202 includes a copier, although not shown. This way, the system 200 allows the user to add content using any external medium.

The memory 212 of the multi-function device 202 stores the job, the content to be added, details of the content to be added, user details, job attributes, code, or other relevant details for implementing the disclosure. The controller 208 or the content addition module 214 may retrieve the details from the memory 212 as and when required. The user interface 204 of the multi-function device 202 displays various options to the user as discussed above in detail. Additionally, the user interface 204 may be used for providing input such as selecting the content, inputting details of the content, etc., at the multi-function device 202. The memory 226 of the portable device 220 stores the content to be added to the job at the multi-function device 202. The memory 226 may store other relevant details for implementing the current disclosure. The user interface 228 of the portable device 220 displays various options to the user and allows him to provide input. For example, the user interface 228 allows the user to browse the content to be added.

Although FIG. 2 is discussed with respect to the portable device 220, but the disclosure can be implemented for other external mediums such as cloud location, network location, etc.

Exemplary Snapshots

Figure 4:
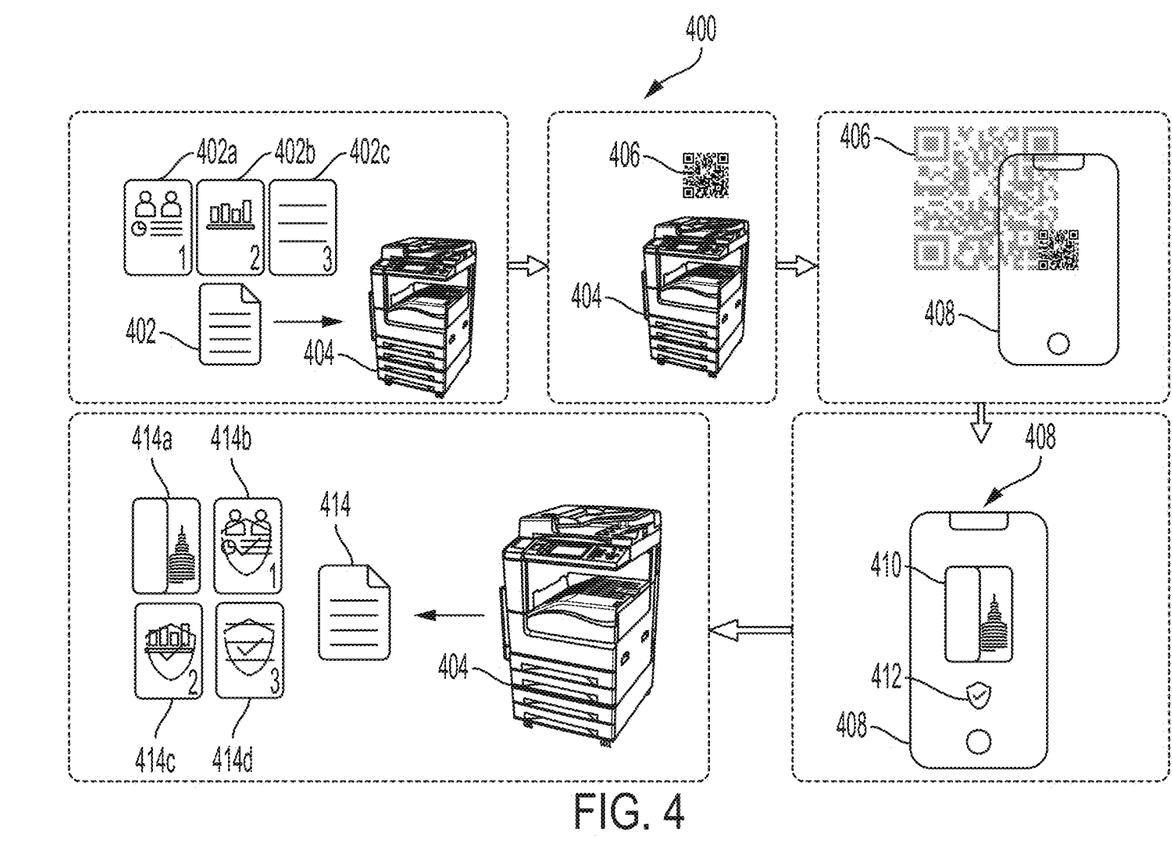
FIG. 4 is an exemplary flow for adding content from a portable device of a user to a job submitted at the multi-function device.

FIG. 4 illustrates an exemplary process flow 400 for adding content such as 410 and 412 stored in a portable device such as 408 to a job/document such as 402. The process flow 400 is explained with respect to a scenario in which a user has a document 402 including 3 pages 402a, 402b, and 402c and each page includes different content. Here, the user wishes to add content such as a cover page to the document 402 and an image as a watermark on all the pages (402a, 402b, 402c) of the document 402. Here, the desired cover page such as 410 and an image of the desired watermark 412 is stored in his mobile phone 408. The user submits the document 402 at the multi-function device 404 for further processing. Then, the user selects the add content option. Once selected, the multi-function device 404 generates a code 406 corresponding to the document 402 submitted for scanning and displays the generated code 406. Once displayed, the user scans the code 406 using his mobile device 408, which allows the user to pair the mobile phone 408 with the multi-function device 404. Once paired, the user selects the desired contents to be added such as the cover page 410 and the image of the watermark 412 and provides details corresponding to each content. Here, it is considered that user selects the content 410 as the cover page, i.e., 1st page and the user selects the content 412 as the watermark, which is to be added on each page 402a, 402b, 402c of the document 402. Once the content is selected and the details to add the content is provided, the multi-function device 404 initiates processing of the received document 402, i.e., scans the document 402 and generates scanned data, and adds the content 410 and 412 to the scanned data based on the user input and generates the final output such as scanned document 414. The multi-function device 404 generates the output document 414 such that in the output document 414, 1st page 414a is the cover page (corresponds to the user selected content 410) and the remaining scanned pages 414b, 414c, 414d include the watermark (which corresponds to content 412).

Exemplary Flowchart

Figure 5:
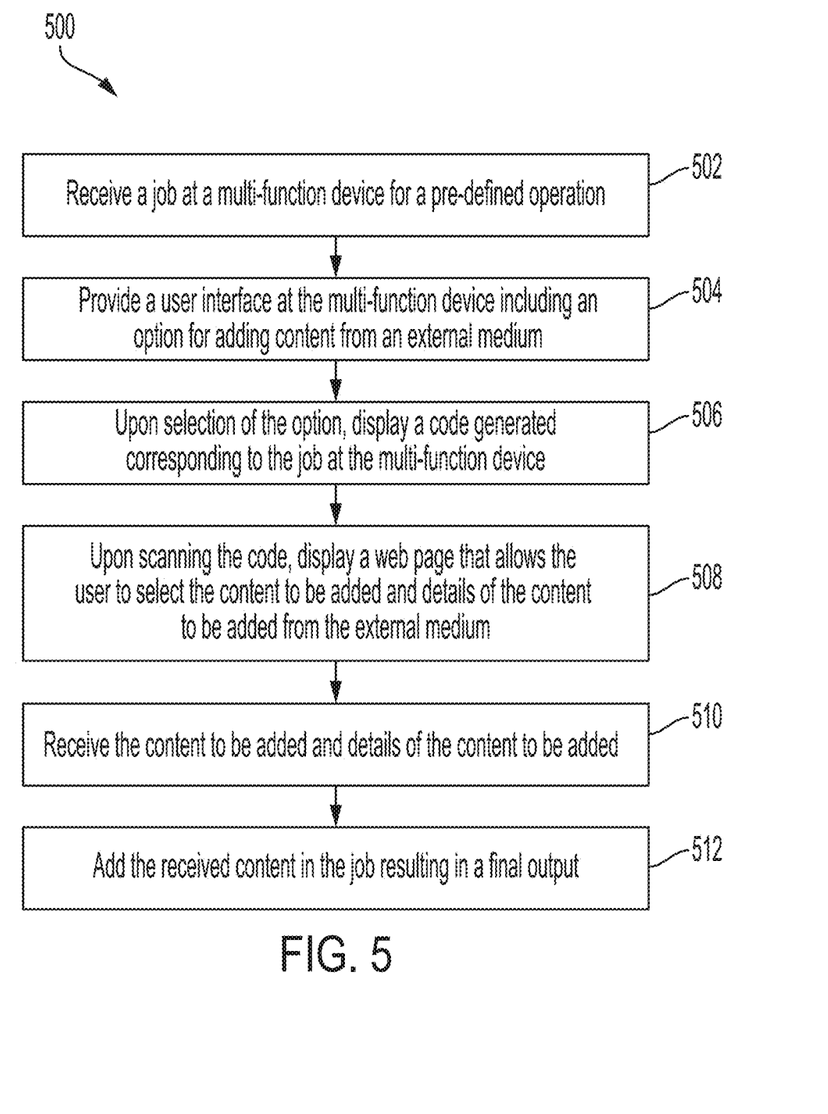
FIG. 5 is a method flowchart for adding content from a portable device of a user to a job at the multi-function device, in accordance with an embodiment of the present disclosure.

FIG. 5 is a method 500 that allows a user to add content from an external medium such as a portable device to a job at a multi-function device. The method 500 may be implemented at a multi-function device, such as the multi-function device 102 of FIG. 1, or the multi-function device 202 of FIG. 2. However, the method 500 may be implemented at any equivalent device with printing functionalities and/or scanning functionality.

The method 500 begins when a user wishes to add content to a job submitted at the multi-function device. Here, the job can be a print job, scan job, copy job, or the like. To this end, the user is required to submit the job. In one example, the user can submit a print job from his computing device. In another example, the user can submit a scan job by submitting a physical document directly at the multi-function device. Once submitted, at 502, the job is received at a multi-function device for a pre-defined operation, such as printing, scanning, or the like. Thereafter, the user accesses the multi-function device.

Once accessed, various options such as scan, print, copy, scan to cloud, or the like, are displayed to the user that allow the user to perform a desired action. Once the user selects the desired option, additional options are displayed to the user that allow the user to configure the parameters associated with the selected action. For example, if the user selects the scan option, various options such as scan resolution option, file type option, single/double-side scan option, or the like, are displayed to the user that allow the user to configure scan-related parameters. Similarly, if the user selects the print option, various options such as colored/black & white print option, tray selection option, single/double-sided print option, or the like, are displayed to the user that allow the user to configure print related parameters. At 504, a user interface including an option for adding content from the external medium (such as portable device) is provided at the multi-function device. The displayed option can be "Add Content" option. The user selects the displayed option.

Upon selection of the option, a code corresponding to the job is generated. At 506, the code generated corresponding to the job is displayed at the multi-function device. Specifically, once the user selects the option a code corresponding to the job is generated and displayed to the user. The user then scans the displayed code via a camera of the portable device. Alternatively, the user scans the displayed code via an app such as code reader app, downloaded on the portable device.

Upon scanning the code, at 508, a web page that allows the user to select the content to be added and details of the content to be added from the external medium is displayed. In detail, once the code is scanned, a request to pair the portable device with the multi-function device is received. In some implementations, an authentication is performed before pairing the portable device with the multi-function device. Thereafter, a temporary web page that allows the user to browse the content to be added in the job is generated. The web page corresponding to the job is displayed to the user. The displayed web page includes various options that allow the user to select one or more content such as images, text, graphs, or the like, stored in the portable device and share the selected content with the multi-function device for addition. Exemplary displayed options include "Add Content to New Pages" option, "Add Content to Existing Pages" option, and "Add Watermark" option. The user selects the displayed options to add desired content and provides details/input regarding addition of the selected content. Once the user selects the content to be added and provides details of the content to be added, the method 500 proceeds forward. The details can be page details and location details as discussed above. Once the content to be added and the details of the content are browsed and selected by the user, the temporary web page may be removed. Here, the temporary web page is generated and displayed to the user on his portable device. The web page allows the user to easily browse the content to be added, provide details of the content to be added and so on, without requiring accessing the multi-function device.

Once selected, at 510, the contents to be added in the job and details of the content to be added is received.

The document, the content to be added and the details related to the content to be added are processed. At 512, the selected content is added in the job. The user selected content is added at a desired location, page of the job and in the desired form. Once added, a final output is generated. For example, the user selected content can be added on an existing page say page 2 of the job in the top right corner as a text. In another example, the user selected content can be added as a new page in the job in the center of the new page as an image. The final output includes the user selected content at the desired location. For example, if the job is a scan job, then the document is scanned and a scanned document is output. The scanned document is displayed to the user and the user can take any desired action such as email, save to cloud location, print, or the like. Further, if the job is a print job, then printed document is output.

This way, the method 500 allows the user to add any content stored in his portable device to the jobs submitted at the multi-function device.

The method 500 may be implemented in the form of non-transitory computer-readable medium storing instructions, which when executed by one or more processors cause the one or more processors to implement the method blocks 502-512.

The present disclosure discloses methods and systems that allow users to add content from an external medium such as a portable device to a job received at a multi-function device. The content can be in the form of text, image, graphics, watermark, document, or a combination thereof. The methods and systems provide a user-friendly and a convenient way to add content to the submitted job at the multi-function device such that upon successfully pairing, the content can be directly transferred from the portable device to the multi-function device. The methods and systems provide a new way of adding content such that the user does not require to add content manually. The methods and systems can be implemented for any jobs such as scan job, print job, or copy job. The methods and systems provide various options to add content such as in between pages of the job, as a cover page, as a last page of the job, or the like. The methods and systems further provide multiple ways of adding the content. For example, the methods and systems allow the user to add the content from a portable device. The methods and systems allow the user to add the content from a network location accessible at the multi-function device. The methods and systems allow the user to add the content from a cloud location accessible at the multi-function device.

The methods and systems can be very useful for Covid-19 situations where the user can directly select the content from his device and is not required to access multi-function device/user interface. For example, upon scanning the code from the user interface of the multi-function device, portable device such as mobile device of the user gets access to the CentreWare Internet Services (CWIS) of the multi-function device and thus, Covid-19 safety protocol can be achieved.

The methods and systems improve user experience and eliminate extra steps in document preparation. The methods and systems can be useful in kiosk environments, for example, and further in support of new interactive workflows.

Also, the disclosure can be implemented for any organization such as banks, hospitals, schools, passport offices, commercial places, etc. For example, a multi-function device such as 102 can be placed in the commercial place such as Staples and Office Depot and users/visitors can use the multi-function device to submit their documents for printing/scanning and add one or more desired content present on their phone to the documents submitted at the multi-function device. This provides convenience to the users/visitors and ensures their safety from diseases like covid, as the current solution reduces the direct interaction of the user with the multi-function device which is accessed by various people throughout the day.

Although, the disclosure is discussed with respect to a scenario where the user adds content stored in his hand-held device to jobs received at the multi-function device, however, the disclosure can be implemented to allow the user to add content directly from the multi-function device itself. In such scenario, the content is pre-stored in the multi-function device, i.e., memory of the multi-function device or at a cloud location associated with the multi-function device. After, submitting a job (scan job or print job) at the multi-function device, the user selects an option, such as "Add content" option to add content to the job. Once selected, the multi-function device allows the user to select and add the pre-stored content. Thereafter, the user selects the desired pre-stored content present in the memory of the multi-function device and provides input on addition of the content. Once provided, the multi-function device downloads/obtains the content from the memory location and input related to the addition of the content. Once obtained, the multi-function device adds the obtained content to the job received at the multi-function device based on the user input and generates an output document.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, printing, adding, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for allowing a user to add content from an external medium to a job submitted at a multi-function device, the method comprising:
   receiving a job at the multi-function device for a predefined operation;
   providing a user interface at the multi-function device comprising an option for adding content from the external medium;
   based on the selection of the option, displaying a code generated corresponding to the job at the multi-function device;
   upon scanning the code, allowing the user to select the content to be added and details of the content to be added from the external medium; and
   adding the selected content in the job resulting in a final output.

2. The method of claim 1, wherein the external medium is at least one of: a portable device, a network location, and a cloud location.

3. The method of claim 1, wherein the job comprises one of: a scan job, a print job or a copy job.

4. The method of claim 1, further comprising, generating the code corresponding to the job submitted at the multi-function device.

5. The method of claim 1, further comprising, receiving details of the content to be added in the job.

6. The method of claim 1, wherein the details comprise at least one of: page details and location details.

7. The method of claim 6, wherein the page details comprise at least one of: where to add the content in the job, whether to add the content as a new page or on existing pages of the job, whether to add the content as a text or as an image in the job or whether to add the content as a watermark in the job.

8. The method of claim 6, wherein the location details represent which location of a page to add the content in the job and the location details comprise at least one of: a top right corner of a page, a top left corner of a page, a bottom right corner of a page, a bottom left corner of a page, and a center of a page.

9. The method of claim 1, further comprising, receiving a selection of the content to be added in the job.

10. The method of claim 1, further comprising, allowing the user to browse the content to be added using the external medium.

11. The method of claim 1, further comprising, generating a temporary web page for allowing the user to browse the content to be added in the job.

12. A system for allowing a user to add content from an external medium to a job submitted at a multi-function device, the system comprising:
the multi-function device for:
receiving a job at the multi-function device for a pre-defined operation;
providing a user interface at the multi-function device comprising an option for adding content from the external medium;
based on the selection of the option, displaying a code generated corresponding to the job at the multi-function device;
upon scanning the code, allowing the user to select the content to be added and details of the content to be added from the external medium; and
adding the selected content in the job resulting in a final output; and
the external medium for:
storing the content to be added in the submitted job.

13. The system of claim 12, wherein the multi-function device generates the code corresponding to the job submitted at the multi-function device.

14. The system of claim 12, wherein the multi-function device receives details of the content to be added.

15. The system of claim 12, wherein the details comprise at least one of: page details and location details.

16. The system of claim 15, wherein the page details comprise at least one of: where to add the content in the job, whether to add the content as a new page or on existing pages of the job, whether to add the content as a text or as an image in the job or whether to add the content as a watermark in the job.

17. The system of claim 15, wherein the location details represent which location of a page to add the content in the job and the location details comprise at least one of: a top right corner of a page, a top left corner of a page, a bottom right corner of a page, a bottom left corner of a page, and a center of a page.

18. The system of claim 12, wherein the multi-function device receives a selection of the content to be added in the job.

19. The system of claim 12, wherein the multi-function device allows the user to browse the content to be added using the external medium.

20. The system of claim 12, wherein the multi-function device generates a temporary web page for allowing the user to browse the content to be added in the submitted job using the external medium.

21. A system for allowing a user to add content from a portable device to a job submitted at a multi-function device, the system comprising:
the multi-function device, comprising:
a receiver for receiving a job at the multi-function device for a pre-defined operation;
a user interface comprising an option for adding content from the portable device;
a controller for:
based on the selection of the option, displaying a code generated corresponding to the job at the multi-function device;
upon scanning the code, allowing the user to select the content to be added and details of the content to be added from the portable device; and
a content addition module for adding the selected content in the job resulting in a final output; and
the portable device for:
storing the content to be added in the submitted job.

22. The system of claim 21, wherein the controller generates the code corresponding to the job submitted at the multi-function device.

23. The system of claim 21, wherein the details comprise at least one of: page details and location details.

24. The system of claim 23, wherein the page details comprises at least one of: where to add the content in the job, whether to add the content as a new page or on existing pages of the job, whether to add the content as a text or as an image in the job or whether to add the content as a watermark in the job.

25. The system of claim 23, wherein the location details represent which location of a page to add the content in the job and the location details comprise at least one of: a top right corner of a page, a top left corner of a page, a bottom right corner of a page, a bottom left corner of a page, and a center of a page.

26. The system of claim 21, wherein the controller receives a selection of the content to be added in the job and/or details of the content to be added.

27. The system of claim 21, wherein the controller generates a temporary web page for allowing the user to browse the content to be added in the submitted job using the portable device.

* * * * *